C. T. FROST.
Straw Cutter.
No. 54,525. Patented May 8, 1866.
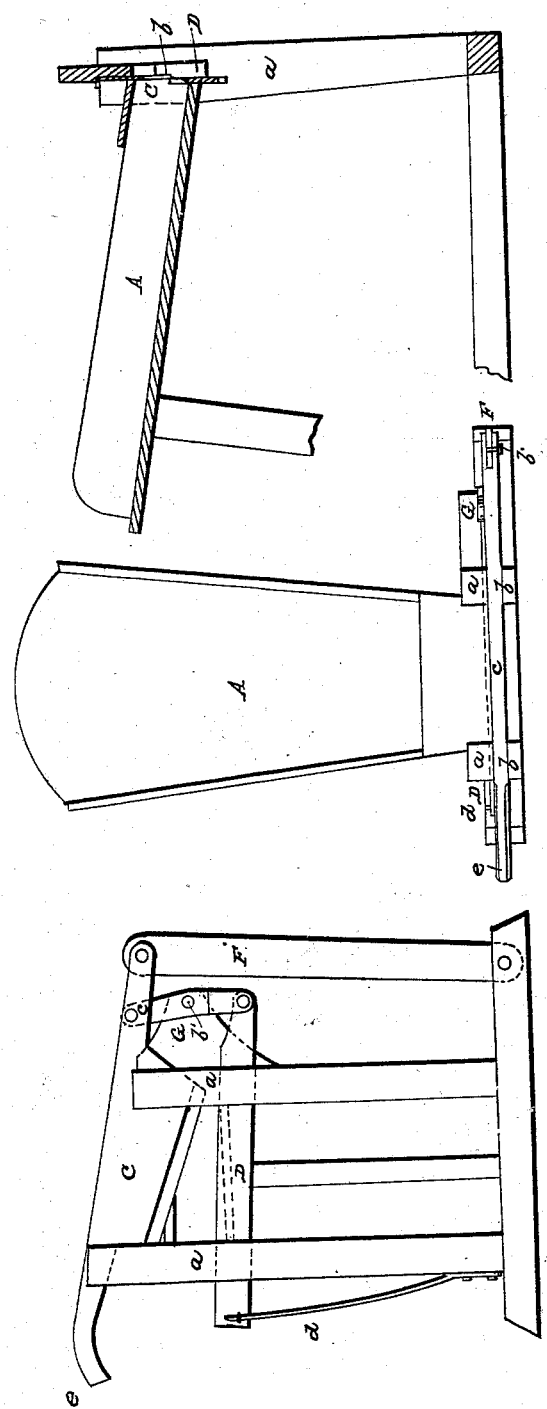
WITNESSES:
INVENTOR.

UNITED STATES PATENT OFFICE.

CLINTON T. FROST, OF MEDFIELD, MASSACHUSETTS.

IMPROVEMENT IN STRAW-CUTTERS.

Specification forming part of Letters Patent No. 54,525, dated May 8, 1866.

*To all whom it may concern:*

Be it known that I, CLINTON T. FROST, of Medfield, in the county of Norfolk and State of Massachusetts, have invented a new and useful Hay-Cutter; and I do hereby declare that the following is a full, clear, and exact description thereof, reference being had to the accompanying drawings, of which—

Figure 1 is a front end elevation of a hay-cutter constructed in accordance with my invention. Fig. 2 is a top view, and Fig. 3 a vertical section, of the same.

The object of my present invention is to produce, by an arrangement of the two knives, a drawing stroke or cut very similar in its action to that of a pair of scissors, except that the under blade moves forward with respect to the lower one, thus making a decided improvement in the cutting-stroke over that of the scissors.

In the drawings, A denotes the trough or chute for holding the hay to be cut, it being supported in part at its front end by two vertical posts, $a\ a$, making part of the frame of the machine. Situated at the front end of the trough, and playing in vertical slots $b\ b$, formed in the posts $a\ a$, are the cutting-knives C D, the knife C being hinged by a pin at its front end to a movable fulcrum-bar, F, extending upward from the base of the frame of the machine. The lower knife, D, is hinged at its front end to the lower end of a bar or lever, G, turning a stationary fulcrum-pin, $b'$, projecting from the post $a$, the upper end or arm of the said lever G being hinged or jointed to the upper knife, C, by a pin, $c$, a short distance from its movable fulcrum-bar F, as shown in Fig. 1 of the drawings. The knife D is to have a spring, $d$, so applied to it as to throw it backward, and at the same time force the upper knife, C, upward after each depression of the said knife C in the act of cutting the hay.

In operating with the above-described machine the hay within the trough A is to be introduced with the left hand between the knives C D and the upper knife depressed by force applied to its handle $e$. This will cause the two knives to meet and pass by one another with a drawing stroke, and very expeditiously, and with the exertion of very little manual force, cut the hay. On removing the right hand from the knife C the two knives C D, by the action of the spring $d$, will be forced apart for a new introduction of hay between them without exertion on the part of the attendant, this operation constituting an important feature in my invention.

I also combine with the above advantages great simplicity and cheapness of construction of the machine.

I do not claim the arrangement of parts as shown in patent numbered 27,487, and granted on the 13th day of March, 1860.

I claim—

The combination of the spring $d$, the knives C D, the bar F, and the lever G, substantially in manner, and to operate as before described.

CLINTON T. FROST.

Witnesses:
F. M. P. STONE,
H. G. PARKER.